US012257547B2

(12) United States Patent
Hjalmarsson et al.

(10) Patent No.: US 12,257,547 B2
(45) Date of Patent: Mar. 25, 2025

(54) DIRECT AIR CAPTURE SYSTEM

(71) Applicant: Siemens Energy Global GmbH & Co. KG, Bayern (DE)

(72) Inventors: Christer Hjalmarsson, Finspong (SE); Peter Jaksch, Norrköping (SE); Oscar Svensson, Linköping (SE); Janos Szijarto, Finspong (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/728,880

(22) PCT Filed: Jan. 20, 2023

(86) PCT No.: PCT/EP2023/051302
§ 371 (c)(1),
(2) Date: Jul. 14, 2024

(87) PCT Pub. No.: WO2023/144018
PCT Pub. Date: Aug. 3, 2023

(65) Prior Publication Data
US 2025/0001357 A1 Jan. 2, 2025

(30) Foreign Application Priority Data
Jan. 26, 2022 (EP) .................................. 22153483

(51) Int. Cl.
*B01D 53/62* (2006.01)
*B01D 53/82* (2006.01)
*B01D 53/96* (2006.01)

(52) U.S. Cl.
CPC ............. *B01D 53/62* (2013.01); *B01D 53/82* (2013.01); *B01D 53/96* (2013.01);
(Continued)

(58) Field of Classification Search
None
See application file for complete search history.

(56) References Cited

U.S. PATENT DOCUMENTS 3,504,483 A 4/1970 Tamura
4,589,892 A * 5/1986 Leonard ................ F24F 3/1423
96/115

(Continued)

FOREIGN PATENT DOCUMENTS

CN 108096990 A 6/2018
CN 112169537 A 1/2021
(Continued)

OTHER PUBLICATIONS

PCT International Search Report and Written Opinion of International Searching Authority mailed Apr. 24, 2023 corresponding to PCT International Application No. PCT/EP2023/051302 filed Jan. 20, 2023.

*Primary Examiner* — John J Figueroa
(74) *Attorney, Agent, or Firm* — Wolter Van Dyke Davis, PLLC

(57) ABSTRACT

A direct air capture system includes a frame arranged to define a first adsorption unit and a second adsorption unit arranged around a central axis, a first adsorption cell disposed in the first adsorption unit and a second adsorption cell disposed in the second adsorption unit, each including a first opening and a second opening, a hub rotatably coupled to the frame for rotation around the central axis, an upper arm and a lower arm each coupled to the hub for co-rotation around the central axis, and an upper lid coupled to the upper arm and a lower lid coupled to the lower arm, both movable between an open position and a closed position. The upper arm and the lower arm are movable so that the upper and (Continued)

lower lids are positioned concentric with the first opening and the second opening, respectively.

12 Claims, 8 Drawing Sheets

(52) U.S. Cl.
CPC .... *B01D 2253/202* (2013.01); *B01D 2253/25* (2013.01); *B01D 2257/504* (2013.01); *B01D 2258/06* (2013.01); *B01D 2259/4009* (2013.01)

(56) References Cited

U.S. PATENT DOCUMENTS

| | | | | |
|---|---|---|---|---|
| 4,793,830 | A * | 12/1988 | Murphy | B01D 53/268 |
| | | | | 95/52 |
| 5,862,819 | A * | 1/1999 | Cradeur | B01D 53/1487 |
| | | | | 134/102.1 |
| 2001/0037948 | A1 * | 11/2001 | Liu | H01M 8/0662 |
| | | | | 205/345 |
| 2003/0106430 | A1 * | 6/2003 | Dee | B01D 53/02 |
| | | | | 95/139 |
| 2014/0205524 | A1 * | 7/2014 | Sevier | B01D 53/75 |
| | | | | 423/220 |
| 2016/0101387 | A1 | 4/2016 | Pedace | |
| 2018/0250609 | A1 | 9/2018 | Zou | |
| 2018/0264437 | A1 * | 9/2018 | Le Bot | B01J 20/20 |

FOREIGN PATENT DOCUMENTS

| | | | |
|---|---|---|---|
| EP | 3725391 | A1 | 10/2020 |
| WO | 2019161420 | A1 | 8/2019 |

* cited by examiner

Section A-A

Section B-B

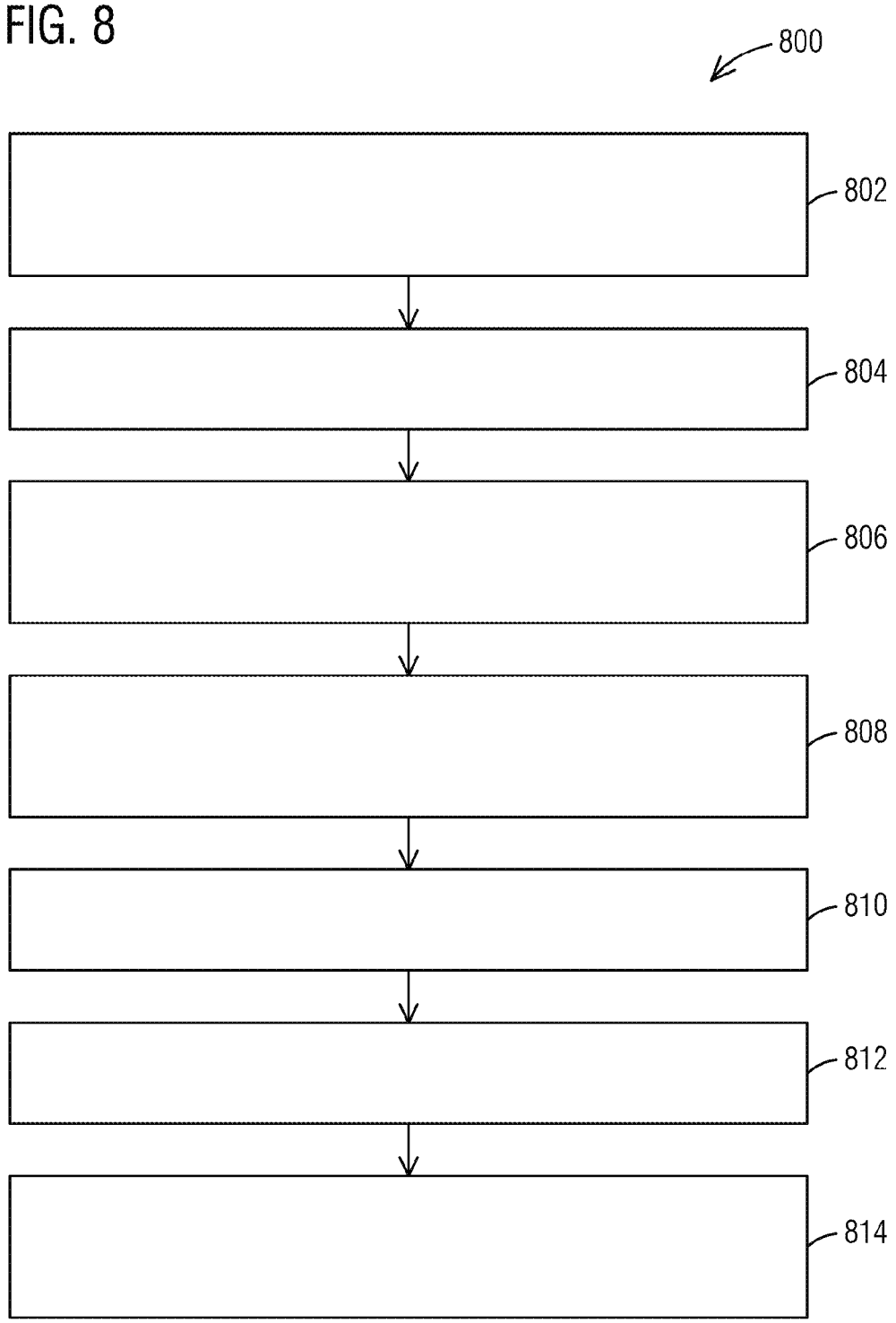

DIRECT AIR CAPTURE SYSTEM

CROSS REFERENCE TO RELATED APPLICATIONS

This application is the US National Stage of International Application No. PCT/EP2023/051302 filed 20 Jan. 2023, and claims the benefit thereof, which is incorporated by reference herein in its entirety. The International Application claims the benefit of European Application No. EP22153483 filed 26 Jan. 2022.

FIELD OF INVENTION

The invention relates to a direct air capture system.

BACKGROUND OF INVENTION

Direct air capture is a process of capturing carbon dioxide ($CO_2$) directly from an air stream. One method of direct air capture uses a sorbent to capture and remove the $CO_2$ from the air stream upon contact. The disadvantages of this method of direct air capture include the high cost of the equipment, the high heat demand for the desorption and its high electricity demand.

SUMMARY OF INVENTION

The aim of the invention is therefore to provide an alternative direct air capture system and a method for its operation, which allows reduction of the equipment and/or operation costs.

In accordance with the invention there is provided a direct air capture system with a: a frame arranged to define a first adsorption unit and a second adsorption unit arranged around a central axis; a first adsorption cell is posed in the first adsorption unit and a second adsorption cell disposed in the second adsorption unit, the first adsorption cell and the second adsorption cell each including a first opening and a second opening; a hub rotatably coupled to the frame for rotation around the central axis; an upper arm coupled to the hub for co-rotation around the central axis; a lower arm coupled to the hub for co-rotation around the central axis; an upper lid coupled to the upper arm and movable between an open position, in which the openings of the adsorption cells are uncovered by the upper lid to allow a flow of air through the adsorption cells, and a closed position, in which the openings of the adsorption cells are covered by the upper lid to prevent a flow of air through the adsorption cells; and a lower lid coupled to the lower arm and movable between an open position, in which the openings of the adsorption cells are uncovered by the lower lid to allow a flow of air through the adsorption cells, and a closed position, in which the openings of the adsorption cells are covered by the lower lid to prevent a flow of air through the adsorption cells; a control unit operable to move the upper arm and the lower arm to the closed position in response to operation in a desorption mode, wherein the upper arm and the lower arm are movable so that the upper lid and lower lid are positioned concentric with the first opening and the second opening of the same absorption cell.

In accordance with the invention there is also provided also a method for operation of the above-referenced direct air capture system, wherein the upper lid is moved between the open position, in which the openings of the adsorption cells are uncovered by the upper lid to allow a flow of air through the adsorption cells, and the closed position, in which the openings of the adsorption cells are covered by the upper lid to prevent a flow of air through the adsorption cells; the lower lid is moved between the open position, in which the openings of the adsorption cells are uncovered by the lower lid to allow a flow of air through the adsorption cells, and the closed position, in which the openings of the adsorption cells are covered by the lower lid to prevent a flow of air through the adsorption cells, and the upper arm and the lower arm are moved to the closed position in response to operation in a desorption mode, wherein the upper arm and the lower arm are moved so that the upper lid and lower lid are positioned concentric with the first opening and the second opening of the same absorption cell.

The system further includes a fixed structure including an opening and a fan positioned in the opening operable to draw air into an inlet of the adsorption cell through sorbent material and out an outlet of the adsorption cell during an adsorption phase of the direct air capture so that the air flows through a wave pattern of the sorbent material. The fixed structure includes an adsorption cell positioned within the fixed structure, the adsorption cell includes a structural shell including an inlet at a first opening and an outlet at a second opening, a sorbent element including a solid frame installed within the structural shell, a sorbent material positioned within a cavity defined by the solid frame, the sorbent material disposed in a wave pattern, a first lid movable between an adsorption position in which the first lid sealing covers the first opening, and a second lid movable between an adsorption position and a desorption position in which the second lid sealing covers the second opening.

Preferably, each of the upper lid and the lower lid comprises a shell, a port opening, and a seal element that selectively cooperates with a surface of one of the first adsorption unit and the second adsorption unit to define a seal.

In another preferred embodiment, the system comprises a first steam piping attached to the hub and from the hub to the port opening of the upper lid.

In another preferred embodiment, the system further comprises a second steam piping attached from the port opening of the lower lid to the hub and from the hub to a position external to the direct air capture system, wherein the second steam piping is arranged to discharge steam and carbon dioxide from the direct air capture system.

Preferably, the first adsorption unit includes a third adsorption cell and a fourth adsorption cell, and the second adsorption unit includes a fifth adsorption cell and a sixth adsorption cell. Still preferably the system comprises in total six adsorption units, each comprising three adsorption cells.

In a preferred embodiment, the system further comprises a service arm including a lifting device for removing a structural shell of the first adsorption cell or the second adsorption cell.

In another preferred embodiment, the adsorption cells include a structural shell including an inlet at one of the openings and an outlet at the other opening, a sorbent element including a solid frame installed within the structural shell, and a sorbent material positioned within a cavity defined by the solid frame, the sorbent material disposed in a wave pattern. Preferably, the sorbent material is a solid amine loaded sorbent.

In yet another preferred embodiment, the system comprises a fixed structure with a fixed structural shell that defines an opening, the fixed structure comprising a fan positioned in the opening operable to draw air into the inlet through the sorbent material and out the outlet during an adsorption phase of the direct air capture. In order to reduce the costs of the system, only one fan is used.

Preferably, the system also comprises a louvered siding attached to the fixed structural shell and positioned between the fixed structural shell and a ground surface that includes a further opening to allow a flow of air into the fixed structural shell.

In order to allow reduction of the equipment and/or operation costs, the system as described above uses for desorption purposes the same lid or set of lids attached to upper arm and lower arm, respectively, to close alternating the adsorption cell or cells of more than one absorption units. The upper and lower arm are rotated synchronously. As long as the desorption is taking place in one or more absorption units, the absorption cells of the remaining absorption units are open, i.e. not covered by the lids and absorption can take place.

BRIEF DESCRIPTION OF THE DRAWINGS

To easily identify the discussion of any particular element or act, the most significant digit or digits in a reference number refer to the figure number in which that element is first introduced.

FIG. 8 illustrates a method for direct air capture 800 in accordance with one embodiment.

DETAILED DESCRIPTION OF INVENTION

One process for carbon dioxide capturing from ambient air includes having a solid sorbent to which the carbon dioxide molecules can adsorb through reactions with amine groups. Other sorbents may also be used in the process including, but not limited to, structures with micropores acting as molecular sieves. During adsorption, air needs to be moved around the sorbent to provide carbon dioxide in air to the sorbent so that it can be adsorbed. During desorption, the sorbent with the adsorbed carbon dioxide needs to be enclosed in a container so that released carbon dioxide can be captured. To desorb, the temperature is raised and the partial pressure of the CO2 is lowered. The latter can be done by purging with another medium and/or lowering the absolute pressure in the sorbent container. In the foregoing process, steam is used for both purging and heating of the sorbent. At the start of the desorption phase, the air pressure in the sorbent container may be lowered using a vacuum pump, thereby lowering the amount of air that is mixed with the CO2 to be delivered by the unit.

Figure 1:
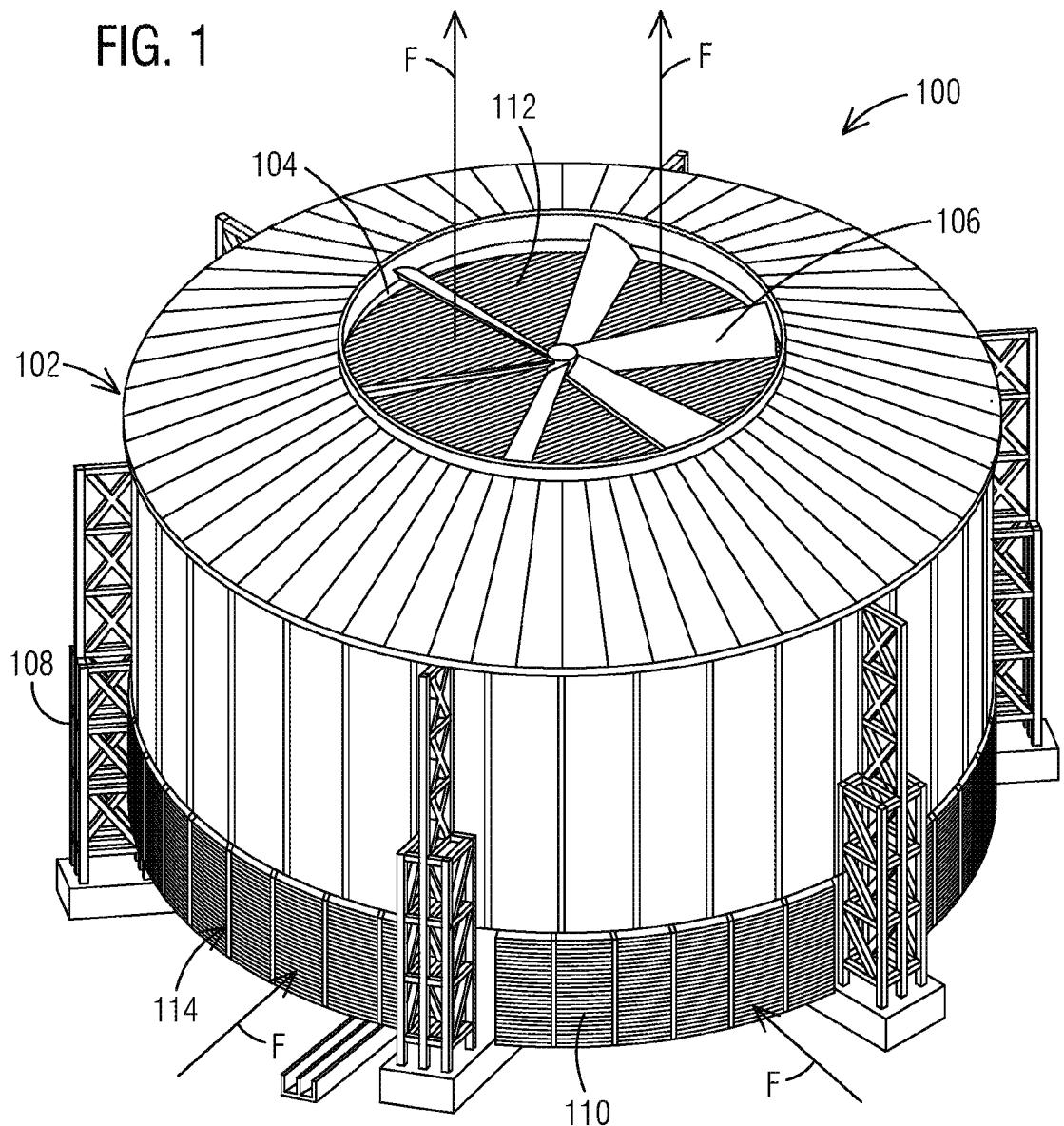
FIG. 1 illustrates an external perspective view of a direct air capture system.

FIG. 1 illustrates a perspective view of a direct air capture system 100 as viewed externally. The direct air capture system 100 is housed by a fixed structural shell 102. In the shown embodiment, the fixed structural shell 102 is cylindrical in shape. The fixed structural shell 102 includes a first opening 104 and an opposing second opening 114 to allow a through flow of air. A single fan 106 is positioned in the first opening 104. The fan 106 is utilized to draw in a flow of air, shown by arrows F, through the fixed structural shell 102. All of the internal components of the direct air capture system 100 are carried by the fixed structural shell 102 mounted on legs 108 so that the fixed structural shell 102 is above a ground surface. In an embodiment, the fixed structural shell 102 is several meters above the ground surface to minimize inflow and air recirculation. Between adjacent legs 108 and between the fixed structural shell 102 and the ground surface is a louvered siding 110 attached to the fixed structural shell 102 to allow the flow of air into the fixed structural shell 102 at the second opening 114 while protecting the direct air capture system 100 from unauthorized entrance of people and animals, for example. Access to technical personnel may be allowed by removing a section of the louvered siding 110. An air filter may also be disposed adjacent to the louvered siding 110 if desired. Just inside the first opening 104, a rain defense louvre unit 112 may be positioned within the fixed structural shell 102 adjacent to the fan 106 to inhibit water from entering the fixed structural shell 102.

A control unit, not shown in the figures, is operable to move the upper arm 210 and the lower arm 210 to the closed position in response to operation in a desorption mode. The upper arm 210 and the lower arm 210 are moved so that the upper lid 214 and lower lid 214 are positioned concentric with the first opening and the second opening of the same absorption cell 202 and close, respectively, seal them.

Figure 2:
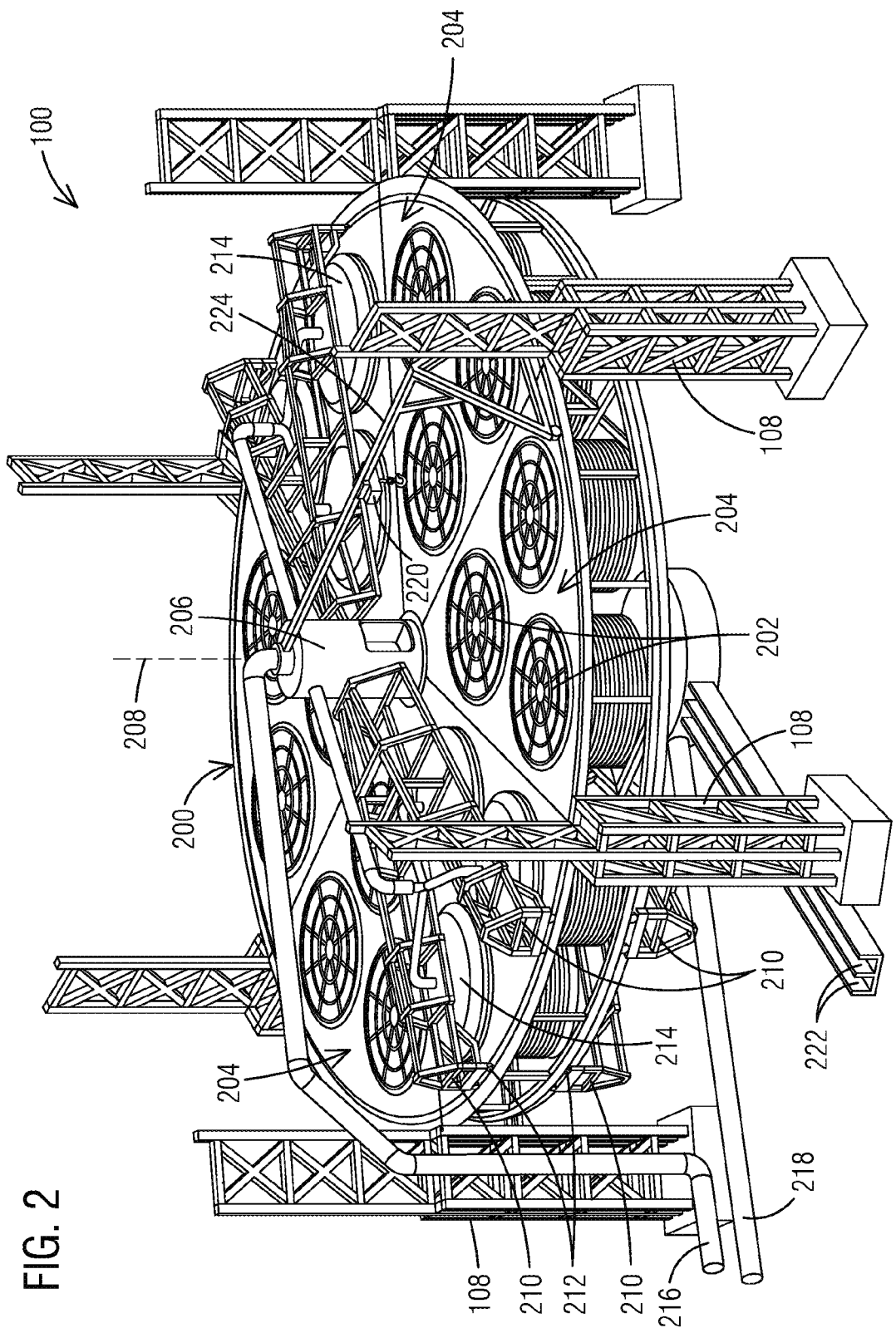
FIG. 2 illustrates an internal perspective view of a direct air capture system.

FIG. 2 illustrates an internal perspective view of a portion of the direct air capture system 100. The internal perspective view illustrates components of the direct air capture system 100 disposed within the fixed structural shell 102. The direct air capture system 100 includes a frame 200 defining sector-shaped adsorption units 204 arranged around a central axis 208. The frame 200 includes an upper plate including outlets and a lower plate including a corresponding number of inlets. Adsorption cells 202 are positioned between the upper plate and the lower plate and are aligned with one of the inlets and outlets so that any flow through the unit passes through one of the adsorption cells 202. Several fasteners interconnect the upper plate and the lower plate to complete the assembly of the frame 200. Each adsorption unit 204 includes three adsorption cells 202 positioned within the frame 200 that seals the air passage so that the flow of air only flows through the adsorption cell 202. In the shown embodiment, there are six adsorption units 204 positioned within the frame 200, each adsorption unit 204 includes three adsorption cells 202. Of course, other constructions could include few than three adsorption cells 202 or more than three adsorption cells 202 as may be required. Also, the number of adsorption units 204 may be different. Each adsorption cell 202 includes a structural shell 402 (see FIG. 4), or container, including an inlet at a first open end/opening and an outlet at a second open end/opening to allow air to flow through the adsorption cell 202 during an adsorption phase of the direct air capture.

A hub 206 is coupled to the frame 200 and rotatable about a central axis 208. The hub 206 is positioned in the center of the frame 200 so that it can spin around the central axis 208 which passes internally through the hub 206. In addition, arms 210 are attached to the hub 206 on both sides of the frame 200. In the shown embodiment, the arms 210 are carried by wheels 212 that roll in a track on the frame 200. The shown embodiment shows two Y-shaped upper arms 210 coupled to the hub 206 for co-rotation about the central axis 208. Although only partially shown, two opposing Y-shaped lower arms 210 also are coupled to the hub for co-rotation about the central axis 208. However, the number of upper arms and lower arms is not limited to two upper arms and two lower arms. The number of upper arms and lower arms may be one or more each. Each Y-shaped arm 210 includes at least one lid 214 so that an upper lid 214 is coupled to the upper arm and a lower lid 214 is coupled to the lower arm. Preferably, the number of lids 214 and their arrangement on the Y-shaped arm 210 correspond to the number and position of the adsorption cells 202 per absorption unit 204. In the shown embodiment, only the upper lids 214 are shown. Both the upper lid 214 and the lower lid 214 are movable between an open position and a closed position. To get an upper lid and the lower lid to the closed position, the upper lid 214 is positioned to be concentric with the first open end of the adsorption cell 202 and the lower lid is positioned to be concentric with the second open end of the adsorption cell 202 by the rotation of the upper arm 210 and the lower arm 210, respectively. The lids 214 then move toward and mate with a flat surface at the respective first open end or second open end of the adsorption cell 202 so that the respective first open end or second open end is covered.

Figure 3:
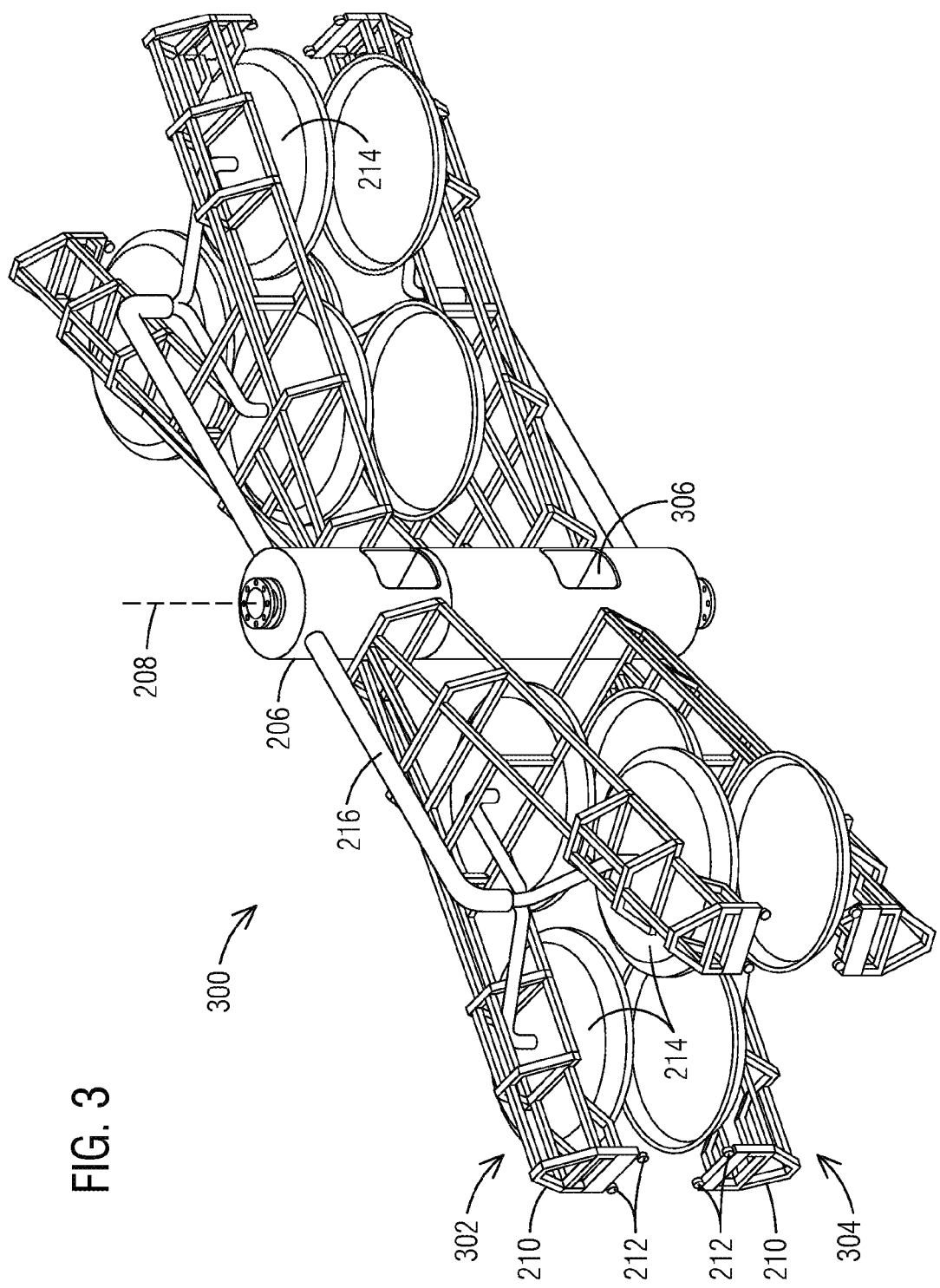
FIG. 3 illustrates a perspective view of a rotating structure.

A first steam piping 216 is attached from an external source to the hub 206 and from the hub 206 to a port opening of an upper lid 214 (see FIG. 3). Likewise, a second steam piping 218 is attached from a port opening of a lower lid 214 (not shown in the figure) to the hub 206 and from the hub 206 out to a position external to the fixed structural shell 102.

A service arm 224 attached to the hub 206 may be equipped with a lifting device 220 that allows for easy removal of the container of the adsorption cell 202. The container may be lowered down to a service area in order to exchange it for another adsorption cell 202. Additional connections to the hub 206 including electrical, control, compressed air, water, drainage, etc., may be run through a channel 222 in order to keep the area near the ground surface clear during operation.

FIG. 3 illustrates a zoomed in view of a rotating structure 300 of the direct air capture system 100 as shown in FIG. 2. The rotating structure 300 includes the hub 206 that rotates about the central axis 208 and two lid arrangements, an upper lid arrangement 302 and a lower lid arrangement 304. In an embodiment, the upper lid arrangement 302 and the lower lid arrangement 304 rotate independently of one another around the central axis 208. The rotating structure 300 rotates via an electrical motor driving the wheels 212. The rotation is controlled by a main controller that monitors and controls the direct air capture system 100. The upper lid arrangement 302 and the lower lid arrangements 304 of FIG. 3 co-rotate around the central axis 208. The upper lid arrangement 302 and the lower lid arrangement 304 each includes an arm 210 attached to the hub 206. Each arm 210 of the upper lid arrangement 302 and the lower lid arrangement 304 includes an upper lid or a lower lid, respectively, that may be positioned via rotation to mate with a surface 404 (shown in FIG. 4) of the structural shell 402 of the adsorption cell 202. The first steam piping 216, as shown in FIG. 3, attaches from the hub 206 to each of the lids 214 of the upper lid arrangement 302. A door 306 within a central portion of the hub 206 may be used to access the lids 214 for inspection and exchange.

Figure 4:
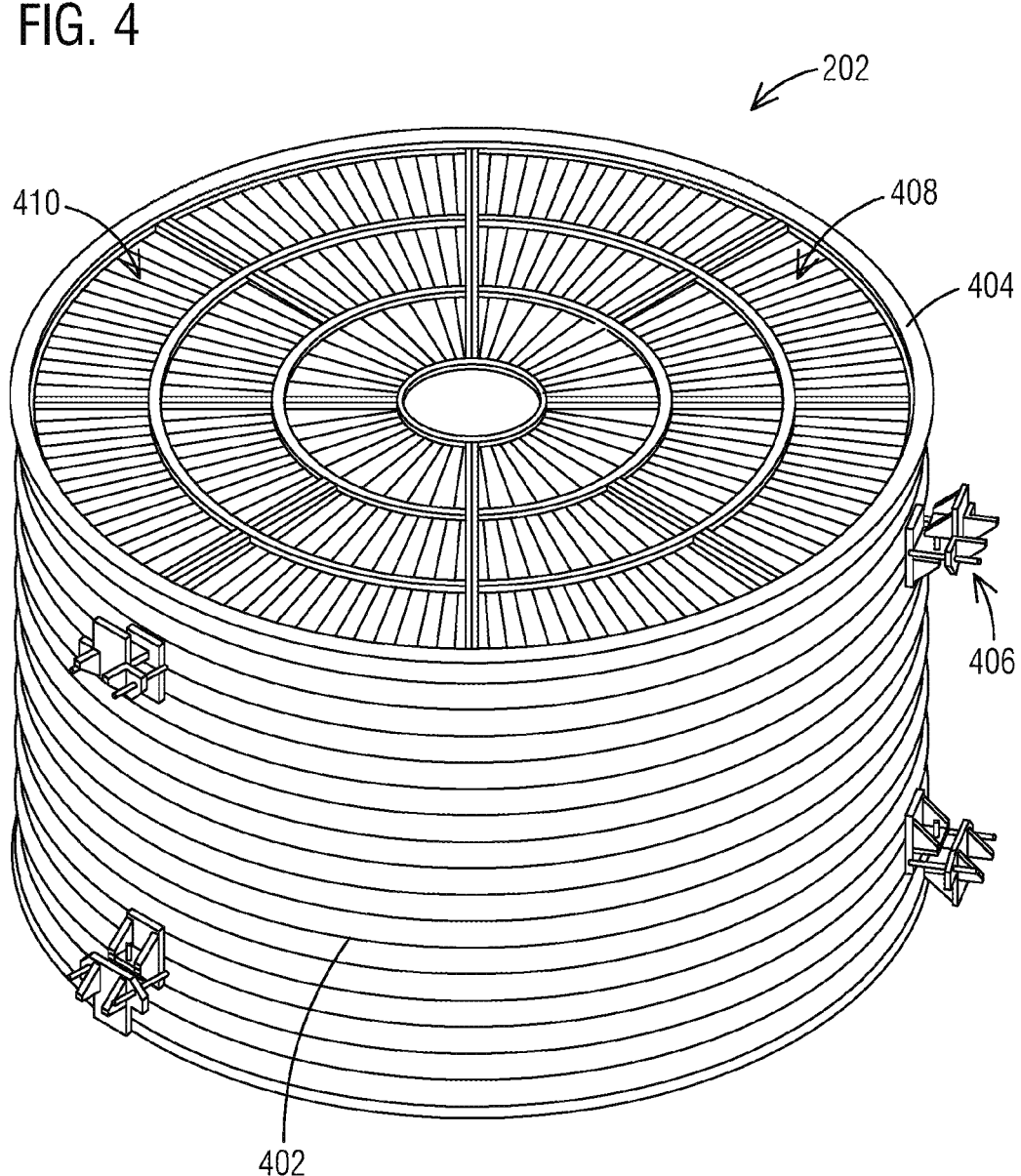
FIG. 4 illustrates a perspective view of an adsorption cell.

FIG. 4 illustrates a perspective view of an adsorption cell 202. The adsorption cell 202 includes a structural shell 402 with a first opening 410 and a second opening (not shown) opposite the first opening 410 to allow for a through flow of air. The structural shell 402 may comprise a corrugated steel container. At each of the first opening 410 and the second opening a surface 404 allows for mating with a corresponding lid 214. FIG. 4 only illustrates the first opening, however, the second opening also includes the surface 404 for mating with a corresponding lid 214. The surface 404 is wide enough to handle misalignments between the adsorption cell and the lid 214. Adjustable mounting hardware 406 is used to attach the adsorption cell 202 to the frame 200. The adsorption cell 202 also includes a sorbent element 408 installed within the structural shell 402. In the shown embodiment, the adsorption cell 202 includes twenty sorbent elements 408, however, the adsorption cell 202 may include a range of 1-40 sorbent elements 408.

Figure 5:
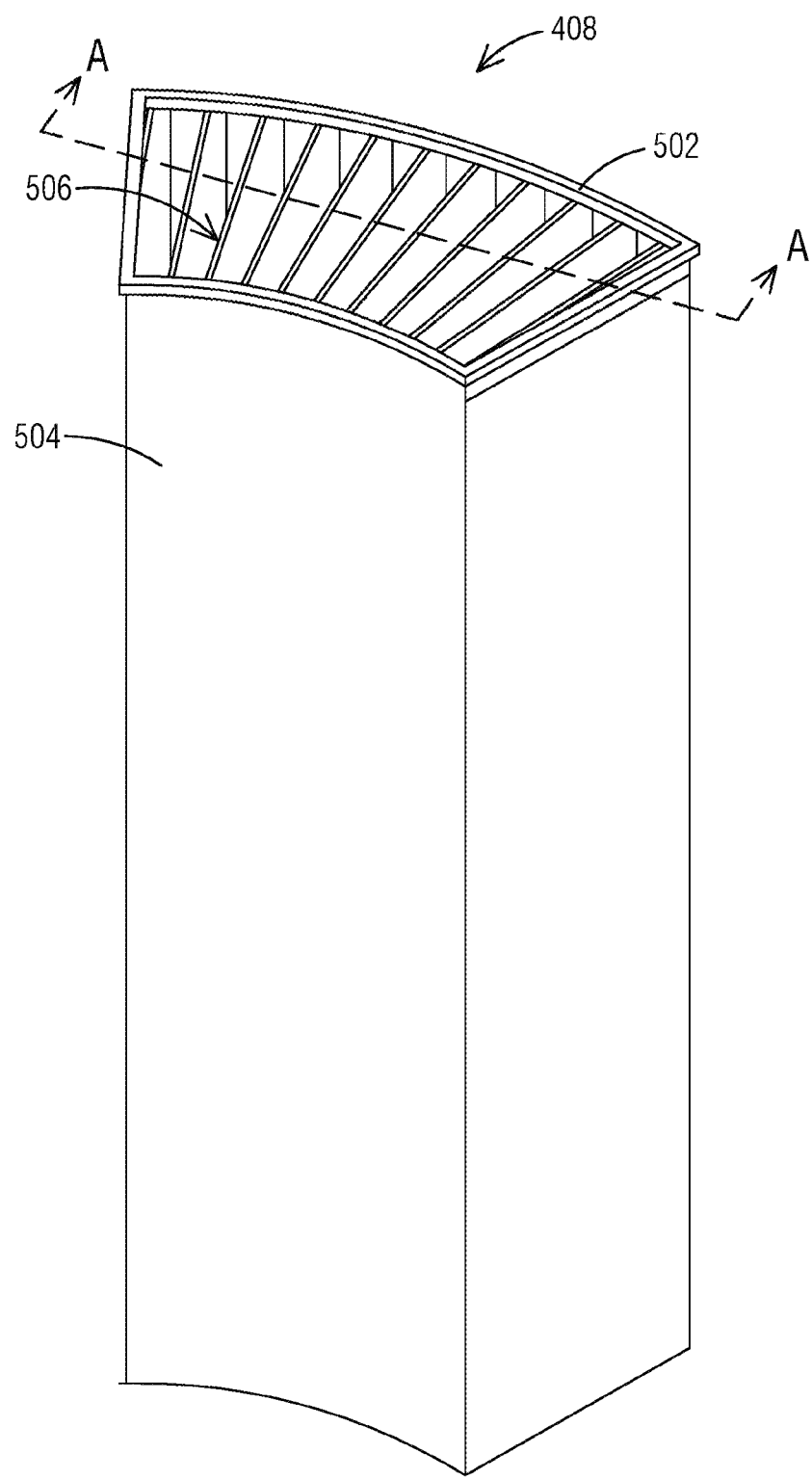
FIG. 5 illustrates an embodiment of a sorbent element.

FIG. 5 illustrates a perspective view of an individual sorbent element 408. Each sorbent element 408 includes a solid frame 502 that may be installed to hang inside the adsorption cell 202 from the structural shell 402. The solid frame 502 includes solid side portions 504 so that the flow of air is forced through a sorbent material 506 positioned within a cavity defined by the solid frame 502.

Figure 6:
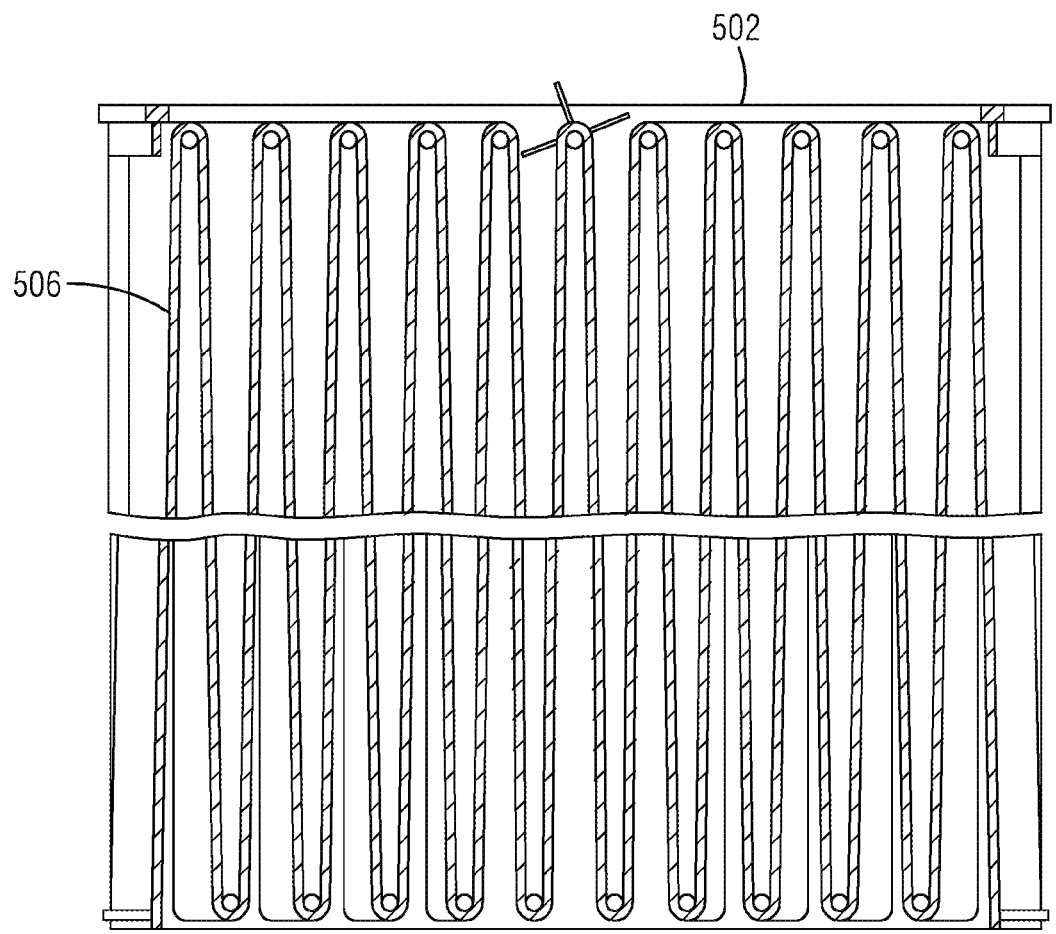
FIG. 6 illustrates a sectional view of the sorbent element of FIG. 5.

FIG. 6 illustrates the sorbent material 506 within the sorbent element 408 according to the section defined by A-A of FIG. 5. The sectional view shows the sorbent material 506 extending lengthwise folded in a wave pattern within the solid frame 502. The wave pattern allows for an increased amount of sorbent material 506 within the solid frame 502 while keeping the thickness of the sorbent material thin, such as between 2-10 mm thick, and the pressure drop minimal. For example, by using a large surface area as compared to a small thickness of the sorbent material, the volume of air flowing through the wave pattern of sorbent material is kept constant while the flow speed and the resistance from the sorbent material is lowered.

The sorbent material 506 may be filled with a solid amine sorbent which is commonly used for removing $CO_2$ from gas streams. The amine may be doped with polymer granules.

The dimensions of the solid frame 502 as well as the number of folds of the sorbent material 506 may be varied based on the sorbent element 408 placement within the adsorption cell 202 in order to maximize the surface area and volume of the sorbent material 506.

Figure 7:
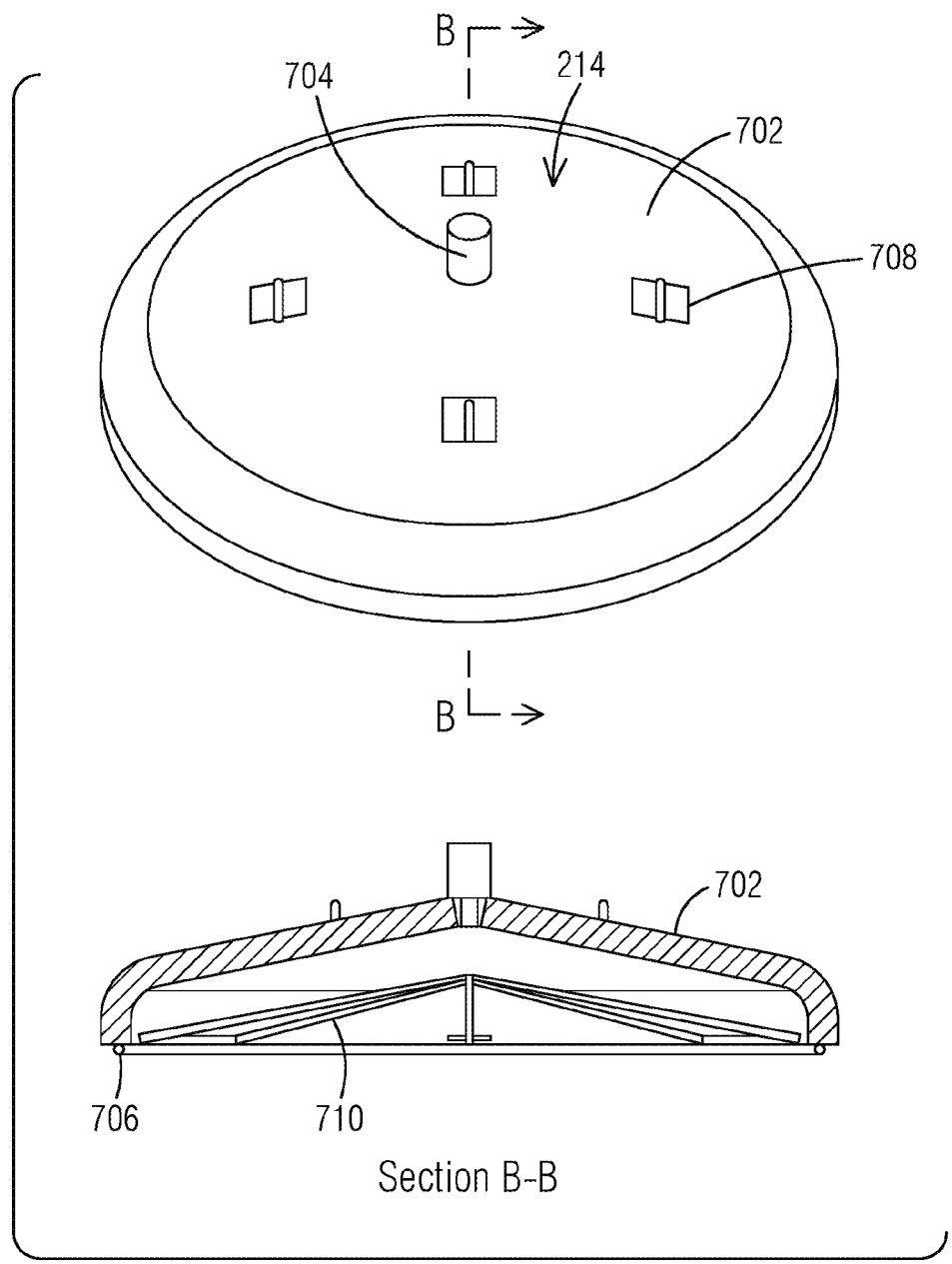
FIG. 7 illustrates an aspect of the subject matter in accordance with one embodiment.

FIG. 7 illustrates a perspective view of a lid 214. FIG. 7 also includes a sectional view of the lid 214 defined by section B-B of FIG. 7. The lid 214 includes a shell 702, a port opening 704, and a seal element 706. The seal element 706 cooperates with the surface 404 of the adsorption cell 202 to define a seal. The seal allows for an airtight connection with the adsorption cell 202 when aligned. The lid 214 is attached to the rotating structure 300 by adjustable mounting hardware 708 allowing for positional control. The lid 214 also includes a one-way valve 710. For the upper lids, the valve 710 allows steam to flow into the adsorption cells 202 but inhibits air to enter the first steam piping 216. For the lower lids, the valve 710 helps to minimize the volume that needs to be evacuated from the adsorption cell 202. In an embodiment, the valve 710 may be a elastomeric lip valve or a duckbill valve or any other type of valve that performs the desired function.

FIG. 8 illustrates a flow chart describing a method for direct carbon dioxide capture 800. In block 802, the method for direct air capture 800 operates a first adsorption cell in an adsorption phase and simultaneously operates a second adsorption cell in a desorption phase. In block 804, air is directed through a first adsorption cell utilizing a fan during the absorption phase of the direct air capture. In block 806, a rotating structure rotates carrying a first lid and a second lid to position the first lid and the second lid to mate with a structural shell of a corresponding second adsorption cell. In block 808, the second adsorption cell is closed by covering each of a first open end and a second open end of the structural shell with the first lid or the second lid, respectively to seal the second adsorption cell. In block 810, steam is fed into the second adsorption cell via a first steam piping and through the first lid. In block 812, steam and carbon dioxide are extracted through the second lid and through a second steam piping. In block 814, the first adsorption cell is uncovered in the adsorption phase while the second adsorption cell is covered by the first lid and the second lid in the desorption phase.

The following description of the method for direct carbon dioxide capture 800 references FIGS. 1 to 8. In operation, a flow of air is drawn into the fixed structural shell 102 through the louvered siding 110 and then through a selected portion of adsorption cells 202 located internally within the fixed structural shell 102 and out through the first opening 104. The fan 106 operates to draw in the flow of air through the fixed structural shell 102 such that only the one fan is needed to operate the direct air capture system 100. In the embodiment shown in FIG. 1, the flow of air is vertically directed out of the first opening 104 away from the ground surface.

During operation of the illustrated arrangement, all or two-thirds of the total adsorption cells 202 operate in an adsorption phase, while none or one-third of the adsorption cells 202 simultaneously operate in a desorption phase. Specifically, the cells are grouped into six units 204 with each unit including three cells 202. Two diametrically opposite units can operate in the desorption phase while the remaining four units operate in the adsorption phase.

For those cells in the adsorption phase, the lids 214, i.e., both the upper lids and lower lids, are in an open position so that the air flows through, each adsorption cell 202 of the first adsorption unit 204. During a time period in which the lids 214 are in the open position, carbon dioxide in the air flow may be adsorbed into the sorbent material 506 within each adsorption cell 202 of the first adsorption unit 204. In an embodiment, the air is drawn through the sorbent material 506 of each adsorption cell 202 for approximately 1 hour and 40 minutes.

After a time period in the adsorption phase, a desorption phase is initiated, in the first adsorption unit 204. The rotating structure 300 rotates so that the lids 214, i.e, both upper lids and the lower lids, rotate to an aligned position and then translate to a closed position with a corresponding structural shell of the adsorption cells 202 of the first absorption unit 204. The upper lid and the lower lid of each adsorption cell 202 are then placed in a closed position, so that the upper lids close a corresponding first open end of the corresponding adsorption cell 202 and the lower lid closes a corresponding second open end of the corresponding adsorption cell 202 to seal the structural shell 402.

During the desorption phase, the temperature within each closed adsorption cell 202 is raised to a range of 60-110 degrees Celsius and the partial pressure of the carbon dioxide within the cavity of closed adsorption cell 202 is reduced. In order to reduce the partial pressure of the carbon dioxide in the closed adsorption cell, the adsorption cell can be purged with another medium and/or the absolute pressure in the cavity of the closed adsorption cell can be lowered thereby reducing the amount of air that is mixed with the carbon dioxide to be delivered by the adsorption cell 202. Reducing the amount of air in the structural shell 402 may be accomplished using a vacuum pump by opening a valve in the second steam piping 218 that is connected to the vacuum pump. When the desired pressure level is reached, the valve to the vacuum pump is closed. In an embodiment, the absolute pressure within the cavity of the closed adsorption cell 202 is lowered to 0.02-0.4 bar. The chosen pressure level sets the steam condensation temperature and is chosen based on the temperature of the available heat for steam generation. In addition to allowing the carbon dioxide to be captured within the sorbent container, the vacuum also protects the sorbent material from degradation that would occur due to exposure to air.

With the lids 214 in the closed position, steam is fed, into the structural shell 402 via the first steam piping 216 through the first lid from an external source. In an embodiment, the steam has a temperature of between 90 and 110 degrees Celsius. Through the second lid, carbon dioxide and steam are extracted, via a second steam piping 218 from the structural shell 402. After feeding steam into the first lid for a desired time, the steam flow from the external source is switched off. The pressure in the first adsorption unit is lowered to a pressure less than 0.15 bar such that a drying/cooling phase is initiated. This drying/cooling phase allows adsorbed water to evaporate and the adsorption cell 202 to cool down.

With regards to the direct air capture system's 100 operational description described above, one adsorption unit, i.e., the first adsorption unit, was referenced. However, multiple adsorption units may be utilized for the direct air capture system 100. For example, referring to FIG. 2, the rotating structure 300 may be used so that a first adsorption unit and a second adsorption unit 204 as well as a fifth adsorption unit 204 and a sixth adsorption unit 204, each having at least one adsorption cell 202, may be in an adsorption phase, i.e., lids 214 in an open position, while a third adsorption unit 204 and a fourth adsorption unit 204, each having at least one adsorption cell 202, may be in a desorption phase, i.e., lids 214 in a closed position. Through rotation of the rotating structure 300, the lids 214 used to close e.g the third adsorption unit 204 and the fourth adsorption unit 204 may then be used to mate with and close the first adsorption unit 204 and the second adsorption unit 204 for the initiation of the desorption phase of these adsorption units 204. In this way, one lid 214 may be used for more than one adsorption cell 202. The ratio of the number of lids and the number of adsorption cell 202 may be chosen so that an optimal ratio of adsorption time to desorption time is achieved.

The proposed direct air capture system utilizes the components of the system as much as possible. For example, each lid may be used for more than one adsorption cell. Heat loss is also reduced from other direct air capture systems by utilizing the steam feed through the rotating structure and the lid arrangements.

The invention claimed is:

1. A direct air capture system, comprising:
   a frame arranged to define a first adsorption unit and a second adsorption unit arranged around a central axis;
   a first adsorption cell disposed in the first adsorption unit and a second adsorption cell disposed in the second adsorption unit, the first adsorption cell and the second adsorption cell each including a first opening and a second opening;
   a hub rotatably coupled to the frame for rotation around the central axis;
   an upper arm coupled to the hub for co-rotation around the central axis;
   a lower arm coupled to the hub for co-rotation around the central axis;

an upper lid coupled to the upper arm and movable between an open position, in which the openings of the adsorption cells are uncovered by the upper lid to allow a flow of air through the adsorption cells, and a closed position, in which the openings of the adsorption cells are covered by the upper lid to prevent a flow of air through the adsorption cells;

a lower lid coupled to the lower arm and movable between an open position, in which the openings of the adsorption cells are uncovered by the lower lid to allow a flow of air through the adsorption cells, and a closed position, in which the openings of the adsorption cells are covered by the lower lid to prevent a flow of air through the adsorption cells, and a control unit operable to move the upper arm and the lower arm to the closed position in response to operation in a desorption mode, wherein the upper arm and the lower arm are movable so that the upper lid and lower lid are positioned concentric with the first opening and the second opening of the same absorption cell.

2. A direct air capture system according to claim 1, wherein each of the upper lid and the lower lid comprises a shell, a port opening, and a seal element that selectively cooperates with a surface of one of the first adsorption unit and the second adsorption unit to define a seal.

3. A direct air capture system according to claim 2, comprising
a first steam piping attached to the hub and from the hub to the port opening of the upper lid.

4. A direct air capture system according to claim 3, comprising
a second steam piping attached from the port opening of the lower lid to the hub and from the hub to a position external to the direct air capture system, wherein the second steam piping is arranged to discharge steam and carbon dioxide from the direct air capture system.

5. A direct air capture system according to claim 1, wherein the first adsorption unit includes a third adsorption cell and a fourth adsorption cell, and the second adsorption unit includes a fifth adsorption cell and a sixth adsorption cell.

6. A direct air capture system according to claim 1, comprising
in total six adsorption units, each comprising three adsorption cells.

7. A direct air capture system according to claim 1, comprising
a service arm including a lifting device for removing a structural shell of the first adsorption cell or the second adsorption cell.

8. A direct air capture system according to claim 1, wherein:
the adsorption cells include a structural shell including an inlet at one of the openings and an outlet at the other opening,
a sorbent element including a solid frame installed within the structural shell, and
a sorbent material positioned within a cavity defined by the solid frame, the sorbent material disposed in a wave pattern.

9. A direct air capture system according to claim 8, wherein the sorbent material is a solid amine loaded sorbent.

10. A direct air capture system according to claim 8, including
a fixed structure with a fixed structural shell that defines an opening, the fixed structure comprising a fan positioned in the opening operable to draw air into the inlet through the sorbent material and out the outlet during an adsorption phase of the direct air capture.

11. A direct air capture system according to claim 10, wherein a louvred siding attached to the fixed structural shell and positioned between the fixed structural shell and a ground surface that includes a further opening to allow a flow of air into the fixed structural shell.

12. A method for operation of the direct air capture system according to claim 1, wherein
the upper lid is moved between the open position, in which the openings of the adsorption cells are uncovered by the upper lid to allow a flow of air through the adsorption cells, and the closed position, in which the openings of the adsorption cells are covered by the upper lid to prevent a flow of air through the adsorption cells;
the lower lid is moved between the open position, in which the openings of the adsorption cells are uncovered by the lower lid to allow a flow of air through the adsorption cells, and the closed position, in which the openings of the adsorption cells are covered by the lower lid to prevent a flow of air through the adsorption cells, and
the upper arm and the lower arm are moved to the closed position in response to operation in a desorption mode, wherein the upper arm and the lower arm are moved so that the upper lid and lower lid are positioned concentric with the first opening and the second opening of the same absorption cell.

* * * * *